(12) United States Patent
Hampton et al.

(10) Patent No.: US 11,163,793 B2
(45) Date of Patent: *Nov. 2, 2021

(54) ORDERED LIST MANAGEMENT IN A REPLICATED ENVIRONMENT

(71) Applicant: International Business Machines Corporation, Armonk, NY (US)

(72) Inventors: Mark C. Hampton, Newtown (AT); Eric Martinez de Morentin, Manly (AT)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/529,786

(22) Filed: Aug. 2, 2019

(65) Prior Publication Data

US 2019/0354538 A1 Nov. 21, 2019

Related U.S. Application Data

(63) Continuation of application No. 12/970,494, filed on Dec. 16, 2010, now Pat. No. 10,372,725.

(51) Int. Cl.
*G06F 16/27* (2019.01)
(52) U.S. Cl.
CPC .................................. *G06F 16/27* (2019.01)
(58) Field of Classification Search
None
See application file for complete search history.

(56) References Cited

U.S. PATENT DOCUMENTS

| 6,826,756 | B1 | 11/2004 | Herrod et al. |
| 7,603,362 | B2 | 10/2009 | Elliot et al. |
| 10,372,725 | B2 | 8/2019 | Hampton |
| 2007/0073655 | A1 | 3/2007 | Chen et al. |
| 2009/0024638 | A1 | 1/2009 | Bangel et al. |

OTHER PUBLICATIONS

ILemming et al., reverse timestamp May 17, 2012, stackoverflow.com, https://stackoverflow.com/questions/10638996/reverse-timestamp. *

(Continued)

*Primary Examiner* — Jason G Liao
(74) *Attorney, Agent, or Firm* — Konrad Raynes Davda & Victor LLP; Janaki K. Davda

(57) ABSTRACT

Embodiments of the present invention provide a method, system and computer program product for ordered list management in a replication environment. In an embodiment of the invention, a method for ordered list management in a replication environment includes selecting an item for positioning in a replicant of an ordered list by an ordered list manager executing in memory by at least one processor of a computer. The method also includes determining an intent of positioning for the selected item and associating the determined intent in an order number with the selected item in the replicant of the ordered list. Finally, the method includes replicating the replicant with the ordered list by synchronizing changes in the replicant with other changes applied to other replicants of the ordered list.

9 Claims, 1 Drawing Sheet

(56) References Cited

OTHER PUBLICATIONS

Choi et al., Re: Why use "Reverse Timestamp" as the Row Key?, apache.org, http://mail-archives.apache.org/mod_mbox/hbase-user/201107.mbox/%3CCALte62yg2f7QJScTq7+93HYhqM-TZCox81KkD6Ox=5KNmAnYtQ@mail.gmail.com%3E.*

White, Hadoop: The Definitive Guide Jun. 2009, O'Reilly Media Inc., 1st ed., Bib info + Chapter 12.*

HopelessRomantic27, Monty Python-Holy Hand Grenade Sep. 1, 2007, YouTube, https://www.youtube.com/watch?v=xOrgLj9lOwk.*

Dean, Order Theory: Lecture Notes for Fall 2015 PhD Class in Decision Theory 2015, Brown University, http://www.columbia.edu/~md3405/DT_Order_15.pdf.*

Ypnos et al., Why did we bother with line numbers at al? Feb. 12, 2009, stackoverflow.com, https://stackoverflow.com/questions/541421/why-did-we-bother-with-line-numbers-at-all.*

Grigorik, Pseudo Reverse Indexes in MySQL Aug. 20, 2007, igvita.com, https://www.igvita.com/2007/08/20/pseudo-reverse-indexes-in-mysql/.*

ILemming et al., reverse timestamp May 17, 2012, stackoverflow, https://stackoverflow.com/questions/10638996/reverse-timestamp.*

Dahl, et al., "Event List Management in Distribution Simulation", Euro-Par 2001, Parallel Processing, 2001—Springer.

"First Come, First Served", 2002, Dictionary.com, https://www.dictionary.com/browse/first-come-first-served.

"Economy > GDP Per Capita: Countries Compared", date Unknown, Nationmaster.com, Economy > GDP per capita: Countries Compared.

Outside Artist, et al., "Nit-Picky Grammar Question . . . ", Mar. 9, 2005, Straightdope.com, https://boards.straightdope.com/smdb/archive/index.php/t-306163.html.

"Team Rankings", date unknown, [captured on Feb. 19, 2009 by archive.org], teamrankings.com, https://web.archive.org/web/20090219010916/https://www.teamrankings.com.

Y789gh, et al., "How to Sort Data Chronologically", Mar. 6, 2009, excelforum.com, http://www.excelforum.com/excel-general/674372-how-to-sort-data-chronologically.html.

List of IBM Patents or Patent Applications Treated as Related, Jan. 15, 2021, 2 pp. [57.489C1 (Appendix P)].

Office Action 1 for U.S. Appl. No. 12/970,494, 13 pp., dated Jun. 12, 2012, [57.489 (OA1)].

Response to Office Action 1 for U.S. Appl. No. 12/970,494, 17 pp., dated Sep. 12, 2012, [57.489 (ROA1)].

Final Office Action 1 for U.S. Appl. No. 12/970,494, 14 pp., dated Jun. 19, 2013, [57.489 (FOA1)].

Notice of Appeal and Pre-Appeal Brief Request for Review for U.S. Appl. No. 12/970,494, 6 pp., Aug. 19, 2013, [57.489 (NtcAppl & PreApplBrf)].

Notice of Panel Decision from Pre-Appeal Brief Review for U.S. Appl. No. 12/970,494, 2 pp., Oct. 24, 2013, [57.489 (NtcPanelDec)].

Office Action 3 for U.S. Appl. No. 12/970,494, 31 pp., dated Feb. 13, 2014, [57.489 (OA3)].

Response to Office Action 3 for U.S. Appl. No. 12/970,494, 22 pp., dated May 7, 2014, [57.489 (ROA3)].

Office Action 4 for U.S. Appl. No. 12/970,494, 43 pp., dated Sep. 24, 2014, [57.489 (OA4)].

Response to Office Action 4 for U.S. Appl. No. 12/970,494, 29 pp., dated Dec. 16, 2014, [57.489 (ROA4)].

Office Action 5 for U.S. Appl. No. 12/970,494, 19 pp., dated Nov. 27, 2015, [57.489 (OA5)].

Response to Office Action 5 for U.S. Appl. No. 12/970,494, 26 pp., dated Feb. 29, 2016, [57.489 (ROA5)].

Final Office Action 2 for U.S. Appl. No. 12/970,494, 32 pp., dated Apr. 19, 2016, [57.489 (FOA2)].

Notice of Appeal and Pre-Appeal Brief Request for Review for U.S. Appl. No. 12/970,494, 6 pp., Jul. 19, 2016, [57.489 (NtcAppl & PreApplBrf)].

Notice of Panel Decision from Pre-Appeal Brief Review for U.S. Appl. No. 12/970,494, 2 pp., Aug. 23, 2016, [57.489 (NtcPanelDec)].

Appeal Brief for U.S. Appl. No. 12/970,494, 35 pp., Sep. 23, 2016, [57.489 (ApplBrf)].

Examiner's Answer for U.S. Appl. No. 12/970,494, 15 pp., dated Nov. 15, 2016, [57.489 (ExamAnswer)].

Reply Brief for U.S. Appl. No. 12/970,494, 11 pp., Jan. 17, 2017, [57.489 (ReplyBrf)].

Decision on Appeal for U.S. Appl. No. 12/970,494, 18 pp., Apr. 24, 2018, [57.489 (DecAppl)].

Request for Rehearing for U.S. Appl. No. 12/970,494, 9 pp., Jun. 25, 2018, [57.489 (ReqRehear)].

Decision on Request for Rehearing for U.S. Appl. No. 12/970,494, 15 pp., Jul. 19, 2018, [57.489 (DecReqRehear)].

Amendment After Decision on Request for Rehearing for U.S. Appl. No. 12/970,494, 19 pp., dated Sep. 19, 2018, [57.489 (DecReqRehear)].

Office Action 7 for U.S. Appl. No. 12/970,494, 21 pp., dated Nov. 26, 2018, [57.489 (OA7)].

Response to Office Action 7 for U.S. Appl. No. 12/970,494, 24 pp., dated Feb. 26, 2019, [57.489 (ROA7)].

Notice of Allowance 1 for U.S. Appl. No. 12/970,494, 11 pp., dated Mar. 21, 2019, [57.489 (NOA1)].

* cited by examiner

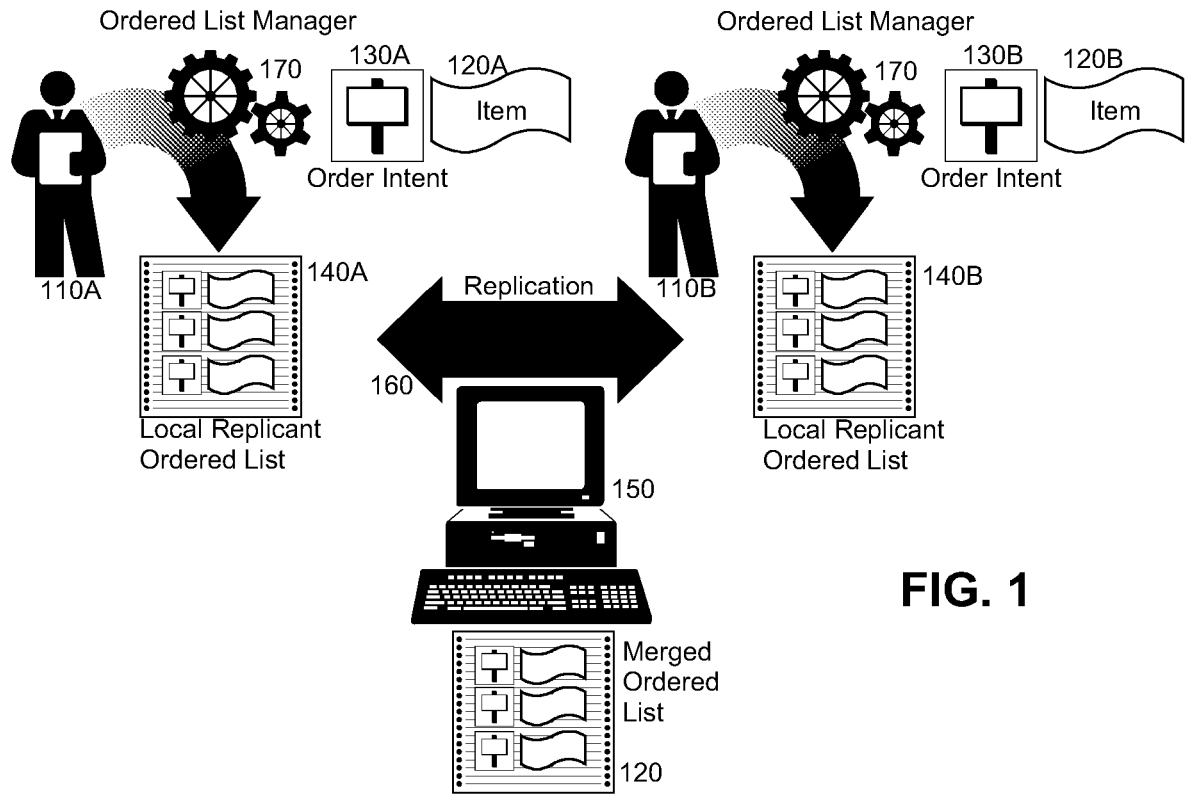
FIG. 1
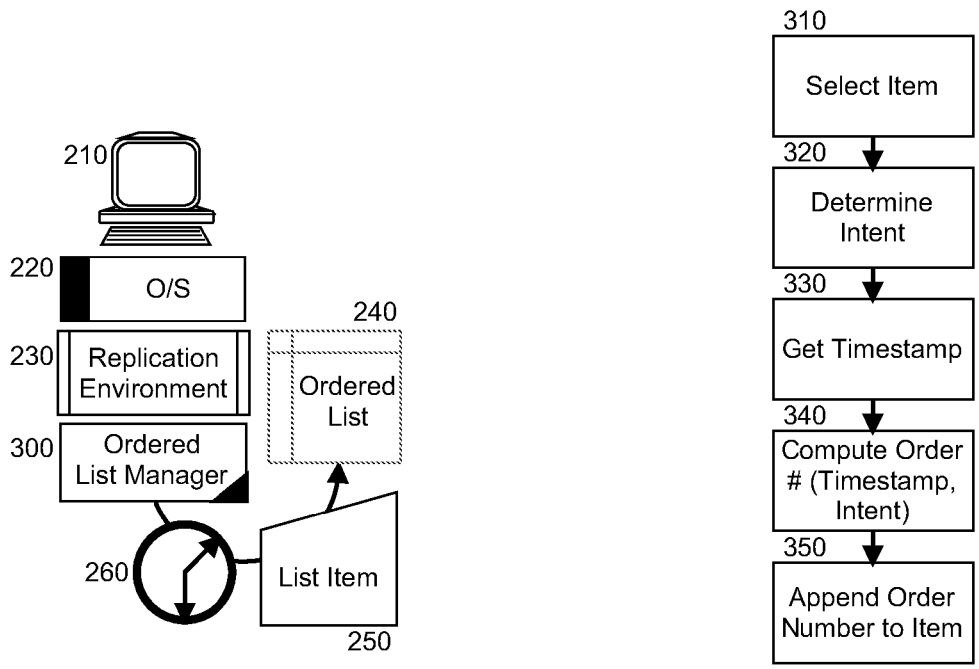
FIG. 2          FIG. 3

ORDERED LIST MANAGEMENT IN A REPLICATED ENVIRONMENT

CROSS-REFERENCE TO RELATED APPLICATIONS

This application is a Continuation of U.S. patent application Ser. No. 12/970,494, filed Dec. 16, 2010, the entirety of which is incorporated herein by reference.

BACKGROUND OF THE INVENTION

Field of the Invention

The present invention relates to ordered list management and more particularly to ordered list management in a replicated environment.

Description of the Related Art

In mathematics, an ordered list is a sequence of elements arranged in a particular order. The concept of an ordered list forms an integral component of computing in that the establishment and maintenance of an ordered list enjoys wide application across many different types of computer programs. Maintaining an ordered list in a single user application involves nothing more than programmatically establishing a data structure in memory to accommodate an ordered list of a particular size and populating the data structure with the requisite elements in a specified order. To that end, an ordered list can be represented by an array, a database table, or a linked list to name a few possible rudimentary structures.

While managing an ordered list in a single user application can be of little consequence, managing an ordered list in a multi-user environment can be challenging. In this regard, in a multi-user environment, peer users can access a single ordered list and add, delete, modify or re-order one or more elements in the ordered list. In the circumstance where each peer user applies changes to the ordered list in sequence, the changes can be applied incrementally so that no conflicts result. However, if peer users apply changes to an ordered list in parallel, conflicts can result. In a client-server environment, managing conflicts amongst changes to an ordered list by different users can be simple to the extent that the changes are managed at the server acting as a gatekeeper to the ordered list. Not so in a peer-to-peer environment.

U.S. Pat. No. 7,603,362 to Geoffrey John Elliot et al. for ORDERED LIST MANAGEMENT addresses the issue of peer to peer management of an ordered list. In the Elliot patent, it is recognized that peer-to-peer file sharing networks—particularly as they relate to the sharing of music play lists—facilitate conflicts resulting from the parallel modification of a play list. As suggested in the Elliot patent, a globally unique identifier is appended to the path value of a position of an item in an ordered list to enable simultaneous or near simultaneous modifications to the ordered list without conflict. Further, an ordered list-specific seed value may be pre-pended to the path value of each item value to ensure clustering of ordered list items when two or more ordered lists are merged.

Like a peer-to-peer computing environment, in a replication environment ordered lists can be modified or merged in parallel by different peer users. Replication refers to the copying of data in two different computing systems and the synchronization of the data so that one replicated set of data is a mirror image of another from which the replicated set of data had been created. Thus, in a replication environment, one user can edit an ordered list locally by changing an ordering of the list while another user can edit the same ordered list also locally. During replication, the changes by each end user must be reconciled before merging the replicated ordered list into a single ordered list. Further, to the extent that different users modify items in a list separately in a replication environment, the ordering algorithms for the ordered list execute separately resulting in duplicate ordering numbers, mixing of items created by multiple users and generally unpredictable ordering of the merged form of the ordered lists.

BRIEF SUMMARY OF THE INVENTION

Embodiments of the present invention address deficiencies of the art in respect to ordered list management and provide a novel and non-obvious method, system and computer program product for ordered list management in a replication environment. In an embodiment of the invention, a method for ordered list management in a replication environment includes selecting an item for positioning in a replicant of an ordered list by an ordered list manager executing in memory by at least one processor of a computer. The method also includes determining an intent of positioning for the selected item and associating the determined intent in an order number with the selected item in the replicant of the ordered list. Finally, the method includes replicating the replicant with the ordered list by synchronizing changes in the replicant with other changes applied to other replicants of the ordered list.

In one aspect of the embodiment, determining an intent of positioning for the selected item includes determining an intent of positioning the selected item at an end of the ordered list, at a beginning of the ordered list, or after an existing item in the ordered list. In the former circumstance, associating the determined intent in an order number with the selected item in the replicant of the ordered list can include retrieving a time stamp for the selected item contemporaneous with the determination of the intent and incorporating the time stamp in the order number. In the secondary circumstance, associating the determined intent in an order number with the selected item in the replicant of the ordered list includes identifying a time stamp for a first item in the ordered list and incorporating a time stamp earlier than the identified time stamp in the order number. Finally, in the latter circumstance, associating the determined intent in an order number with the selected item in the replicant of the ordered list includes identifying a time stamp for the existing item in the ordered list, retrieving a time stamp for the selected item contemporaneous with the determination of the intent, subtracting the retrieved time stamp from a maximum time stamp value to produce a reversed time stamp value, and incorporating the identified time stamp and the reversed time stamp value in the order number.

In another embodiment of the invention, a data processing system providing a replication environment can be configured for ordered list management. The system can include a host computer with memory and at least one processor and a replicant of an ordered list persisted in the memory. The system further can include an ordered list manager executing in the memory. When executing in memory, the ordered list manager can select an item for positioning in the replicant, determine an intent of positioning for the selected item, associate the determined intent in an order number with the selected item in the replicant of the ordered list, and replicate the replicant with the ordered list by synchronizing changes in the replicant with other changes applied to other replicants of the ordered list.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 1 is a pictorial illustration of a process for ordered list management in a replication environment;

FIG. 2 is a schematic illustration of a data processing system in a replication environment configured for ordered list management; and, FIG. 3 is a flow chart illustrating a process for ordered list management in a replication environment.

DETAILED DESCRIPTION OF THE INVENTION

Embodiments of the invention provide for ordered list management in a replication environment. In accordance with an embodiment of the invention, an item can be added to an ordered list managed locally in a replication environment. The intent of positioning the item in the ordered list can be determined relative to other items in the ordered list, such as an intent to insert the item at an end of the ordered list, after a specific item in the ordered list, or at the beginning of the list. An order number can be computed based upon the intent of positioning and associated with the item to be added to the ordered list. Thereafter, subsequent to replication, merging other changes to the ordered list performed elsewhere can be facilitated by identifying an intent of positioning for each change in the ordered list.

In further illustration, FIG. 1 pictorially shows a process for ordered list management in a replication environment. As shown in FIG. 1, different users 110A, 110B can manage respectively different replicants 140A, 140B of an ordered list 120 stored in a host computing system 150 by way of ordered list management logic 170. For each item 120A, 120B positioned in a corresponding replicant 140A, 140B of the ordered list 120, an intent of positioning can be determined for the corresponding item 120A, 120B and associated therewith as an order number 130A, 130B.

For example, if an item 120A, 120B is to be added to an end of a corresponding one of the replicants 140A, 140B, the intention to position the item 120A, 120B at the end of the corresponding one of the replicants can be specified in an order number 130A, 130B and associated with the item 120A, 120B. Likewise, if an item 120A, 120B is to be added after another item in one of the replicants 140A, 140B, the intention to position the item 120A, 120B after the other item in the corresponding one of the replicants can be specified in an order number 130A, 130B and associated with the item 120A, 120B. In this way, during a replication process 160 in which the different replicants 140A, 140B are synchronized with the ordered list 120, the intent of positioning for each item in the replicants 140A, 140B can be considered during the process of merging all changes of the replicants 140A, 140B into the ordered list 120.

The process described in connection with FIG. 1 can be implemented in a data processing system supporting replication of data. In yet further illustration, FIG. 2 schematically shows a data processing system in a replication environment configured for ordered list management. The system can include a host computer 210 with at least one processor and memory. An operating system 220 can execute in the host computer 210 and can support the operation of a replication environment in which application program logic manipulates, creates, retrieves and consumes replicants of data manipulated, created, retrieved and consumed by others in other computers. As is the case in a replication environment, periodically, the replicants are synchronized through a merger of changes to the replicants.

An ordered list manager 300 can operate in connection with the replication environment 230 in the operating system 220. The ordered list manager 300 can include program code that when executed in the computer 210 manages positioning of an item 250 in an ordered list 240 by ascertaining an intent of positioning of the item 250 and associating an order number reflecting the intent of positioning with the item 250 in the ordered list 240. For instance, an order number 260 can be determined for the item 250 and associated with the item 250 to indicate an intent to place the item 250 at the beginning of the ordered list 240, or at the end of the ordered list 240, or after a specific item in the ordered list 240.

In this regard, an order number 260 providing for a time stamp relative to other time stamps for other items of the ordered list 240 can indicate an intent to place an associated item at the end of the ordered list 240. Alternatively, placing in the order number 260 a least recent time stamp relative to other time stamps for other items of the ordered list 240 can indicate an intent to place an associated item at the beginning of the ordered list 240. Finally, an order number 260 providing for the subtraction of a maximum time stamp value from a time stamp for an existing item in the ordered list 240 to produce a "reversed time stamp value" in order to indicate an intent to place an associated item after the existing item in the ordered list 240.

In all cases, the order number 260 preferably can include a time stamp contemporaneous to the determination of the intent for an associated item, and any computed value requisite to expressing the intent. For instance, an exemplary time stamp Aug. 17, 2007 at 1:03 in the afternoon expressing an intent to insert an item after an existing item with a time stamp of Apr. 5, 2007 at 12:23 in the afternoon can provide: ORDER NUMBER 2007-04-05-1223-7992-04-14-1097 wherein the maximum time stamp value is 9999-12-31-2400 and the reverse time stamp value is 7992-04-14-1097. To the extent that the order number becomes too large, the order number can be compressed, or the amount of data truncated by reducing the precision of the time stamp, for example by limiting the notation of the year to only two digits, or by eliminating the year in its entirety. Alternatively, a base number system can vary to reduce the number of digits, for instance by adjusting the order number to a hexadecimal value.

In yet further illustration of the operation of the ordered list manager, FIG. 3 is a flow chart illustrating a process for ordered list management in a replication environment. Beginning in block 310, an item can be selected for ordering in an ordered list. For example, item can be an existing item in the ordered list, or a new item to be added to the ordered list. In block 320, the intent of positioning the item in the ordered list can be determined, such as positioning the item at the beginning of the ordered list, at an end of the ordered list, or after an existing item in the ordered list. In block 330, a time stamp can be retrieved and in block 340, an order number reflective of the determined intent can be computed based upon the time stamp. Finally, in block 350, the order number can be associated with or appended to the selected item. In this way, when replicating the ordered list, the order number can be accounted for in merging the changes of other replicants to the ordered list.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for ordered list management, comprising:
   selecting an item for positioning in a replicant of an ordered list;
   creating a time stamp for the selected item contemporaneous with an intent to position the selected item after an existing item in the replicant;
   creating a reversed time stamp by subtracting a maximum time stamp from a time stamp for the existing item in the replicant,
   computing an order number in the replicant for the selected item by incorporating the time stamp for the selected item and the reversed time stamp into the order number;
   synchronizing changes in the replicant with other changes applied to other replicants of the ordered list using the order number for the selected item in the replicant and an order number of each other item in the other replicants; and
   merging the replicant with the ordered list.

2. The method of claim 1,
   further comprising:
   creating a time stamp for another selected item contemporaneous with an intent to position the another selected item at an end of the replicant, and
   computing another order number in the replicant for the another selected item by incorporating the time stamp for the another selected item into the another order number.

3. The method of claim 1,
   further comprising:
   creating a time stamp for another selected item earlier than a time stamp of a first item in the replicant with an intent to position the another selected item at a beginning of the replicant, and
   computing another order number in the replicant for the another selected item by incorporating the time stamp for the another selected item into the another order number.

4. A data processing system for ordered list management, the system comprising:
   a host computer with memory and at least one processor;
   a replicant of an ordered list persisted in the memory; and,
   an ordered list manager executing in the memory to perform:
      selecting an item for positioning in a replicant of an ordered list;
      creating a time stamp for the selected item contemporaneous with an intent to position the selected item after an existing item in the replicant;
      creating a reversed time stamp by subtracting a maximum time stamp from a time stamp for the existing item in the replicant;
      computing an order number in the replicant for the selected item by incorporating the time stamp for the selected item and the reversed time stamp into the order number;
      synchronizing changes in the replicant with other changes applied to other replicants of the ordered list using the order number for the selected item in the replicant and an order number of each other item in the other replicants; and
      merging the replicant with the ordered list.

5. The system of claim 4, wherein the ordered list manager executes in the memory to perform:
   creating a time stamp for another selected item contemporaneous with an intent to position the another selected item at an end of the replicant, and
   computing another order number in the replicant for the another selected item by incorporating the time stamp for the another selected item into the another order number.

6. The system of claim 4, wherein the ordered list manager executes in the memory to perform:
   creating a time stamp for another selected item earlier than a time stamp of a first item in the replicant with an intent to position the another selected item at a beginning of the replicant, and
   computing another order number in the replicant for the another selected item by incorporating the time stamp for the another selected item into the another order number.

7. A computer program product for ordered list management, the computer program product comprising:
   a computer readable storage medium having computer readable program code embodied therewith, the computer readable program code executable to perform operations comprising:
      selecting an item for positioning in a replicant of an ordered list;
      creating a time stamp for the selected item contemporaneous with an intent to position the selected item after an existing item in the replicant;
      creating a reversed time stamp by subtracting a maximum time stamp from a time stamp for the existing item in the replicant,
      computing an order number in the replicant for the selected item by incorporating the time stamp for the selected item and the reversed time stamp into the order number;
      synchronizing changes in the replicant with other changes applied to other replicants of the ordered list using the order number for the selected item in the replicant and an order number of each other item in the other replicants; and merging the replicant with the ordered list.

8. The computer program product of claim 7, wherein the computer readable program code is executable to perform:

creating a time stamp for another selected item contemporaneous with an intent to position the another selected item at an end of the replicant, and computing another order number in the replicant for the another selected item by incorporating the time stamp for the another selected item into the another order number.

9. The computer program product of claim 7, wherein the computer readable program code is executable to perform creating a time stamp for another selected item earlier than a time stamp of a first item in the replicant with an intent to position the another selected item at a beginning of the replicant, and computing another order number in the replicant for the another selected item by incorporating the time stamp for the another selected item into the another order number.

\* \* \* \* \*